US009396177B1

(12) United States Patent
Kursun

(10) Patent No.: US 9,396,177 B1
(45) Date of Patent: Jul. 19, 2016

(54) SYSTEMS AND METHODS FOR DOCUMENT TRACKING USING ELASTIC GRAPH-BASED HIERARCHICAL ANALYSIS

(71) Applicant: JPMorgan Chase Bank, N.A., New York, NY (US)

(72) Inventor: Eren Kursun, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 171 days.

(21) Appl. No.: 14/177,033

(22) Filed: Feb. 10, 2014

(51) Int. Cl.
*G06F 17/27* (2006.01)

(52) U.S. Cl.
CPC .................................... *G06F 17/27* (2013.01)

(58) Field of Classification Search
CPC ..................................................... G06F 17/27
USPC ......... 704/2, 4, 7, 9, 205, 211, 217, 218, 220, 704/236–246
See application file for complete search history.

(56) References Cited

U.S. PATENT DOCUMENTS

| | | | | |
|---|---|---|---|---|
| 7,117,231 | B2 * | 10/2006 | Fischer | H04N 21/235 |
| 2004/0105583 | A1 * | 6/2004 | Jacobs | G06K 9/00463 382/173 |
| 2004/0193789 | A1 * | 9/2004 | Rudolf | G06N 3/063 711/108 |
| 2006/0050933 | A1 * | 3/2006 | Adam | G06K 9/00221 382/118 |
| 2014/0019121 | A1 * | 1/2014 | Bao | G10L 15/22 704/9 |

* cited by examiner

*Primary Examiner* — Marcellus Augustin
(74) *Attorney, Agent, or Firm* — Hunton & Williams LLP

(57) ABSTRACT

Systems and methods for document tracking using elastic graph-based hierarchical analysis are disclosed. According to one embodiment, a method may include at least one computer processor identifying a sector for the document; the at least one computer processor retrieving a customization library for the document based on the sector; the at least one computer processor analyzing a structure of the document using the customization library, whereby a plurality of markers in first the document are identified; and the at least one computer processor generating an elastic graph for the document based on the plurality of markers.

24 Claims, 5 Drawing Sheets

SYSTEMS AND METHODS FOR DOCUMENT TRACKING USING ELASTIC GRAPH-BASED HIERARCHICAL ANALYSIS

BACKGROUND OF THE INVENTION

1. Field of the Invention

The present invention generally relates to electronic communications, and, more particularly, to systems and methods for document tracking using elastic graph-based hierarchical analysis.

2. Description of the Related Art

Tracking sources, life cycles, interdependencies and extraction of documents is of great interest in with highly-sensitive documents. For example, a business analyst may extract parts, data, or the entirety of highly critical documents and leak them to external sources. While this topic is of great interest, it is also considered highly challenging due to the complexities involved in such processing.

SUMMARY OF THE INVENTION

Systems and methods for document tracking using elastic graph-based hierarchical analysis are disclosed.

Methods for elastic graph-based hierarchical analysis of a document are disclosed. According to one embodiment, the method may include (1) at least one computer processor identifying a sector for the document; (2) the at least one computer processor retrieving a customization library for the document based on the sector; (3) the at least one computer processor analyzing a structure of the document using the customization library, whereby a plurality of markers in first the document are identified; and (4) the at least one computer processor generating an elastic graph for the document based on the plurality of markers.

In one embodiment, natural language processing may be used to analyze the structure of the document.

In one embodiment, the marker may be an expression, a keyword, an alternate expression for a keyword, a node, an edge, etc.

In one embodiment, the method may further include the at least one computer processor applying a weight to at least one marker. In one embodiment, the weight may be determined from the customization library.

In one embodiment, the step of analyzing a structure of the document may include the at least one computer processor performing a metric-based analysis of the document based on at least one of a time stamp, a word match, a language proximity, a statistical frequency analysis of a plurality of expressions, a vector based analysis, and an expressions match.

In one embodiment, the sector may include a subject matter of the document, an industry for the document, and/or an audience for the document.

In one embodiment, the identification of the plurality of markers is further based on a criticality level of the document.

Methods for comparing a first document to a second document are disclosed. In one embodiment, the method may include (1) at least one computer processor identifying a sector for the first document; (2) the at least one computer processor retrieving a customization library for the first document based on the sector; (3) the at least one computer processor generating an elastic graph for the first document based on the customization library; (4) the at least one computer processor generating an elastic graph for a second document based on the customization library; and (5) the at least one computer processor comparing the elastic graph for the first document to the elastic graph for the second document.

In one embodiment, the step of comparing the elastic graph for the first document to the elastic graph for the second document may include comparing a plurality of markers in the elastic graph for the first document to a plurality of markers in the elastic graph for the second document.

In one embodiment, the step of comparing the elastic graph for the first document to the elastic graph for the second document may include determining that a matching metric for the comparison exceeds a threshold. The threshold may be based on the customization library.

In one embodiment, the step of comparing the elastic graph for the first document to the elastic graph for the second document may include the at least one computer processor generating a sub-graph for the elastic graph for the first document based on the customization library; the at least one computer processor generating a sub-graph for the elastic graph for the second document based on the customization library; and the at least one computer processor comparing the sub-graph for the elastic graph for the first document to the sub-graph for the elastic graph for the second document.

In one embodiment, the method may include the at least one computer processor reordering the elastic graph for the first document; and the at least one computer processor comparing the reordered elastic graph for the first document to the elastic graph for the second document.

In one embodiment, the method may further include the at least one computer processor generating an elastic graph for a third document; and the at least one computer processor comparing the elastic graph for the first document to the elastic graph for the third document.

In one embodiment, the first document may include at least a portion of the first document, and the second document may include at least a portion of the second document.

Methods for comparing a first document to a second document are disclosed. According to one embodiment, the method may include (1) at least one computer processor identifying a portion of a first document and a portion of a second document for comparison; (2) the at least one computer processor identifying a sector for the first document; (3) the at least one computer processor retrieving a customization library based on the sector; (4) the at least one computer processor comparing at least one of a time stamp and a watermark from the first document to a time stamp or watermark in the second document; (5) the at least one computer processor using natural language processing to structurally analyze the portion of the first document and the portion of the second document; (6) the at least one computer processor generating an first elastic graph for the portion of first document and a second elastic graph for the portion of the second document based on the customization library; and (7) the at least one computer processor calculating a first matching metric based on a comparison of the first elastic graph to the second elastic graph.

In one embodiment, the method may further include the at least one computer processor reordering the first elastic graph; the at least one computer processor calculating a second matching metric based on a comparison of the reordered first elastic graph to the second elastic graph; and the at least one computer processor selecting the higher of the first matching metric and the second matching metric.

In one embodiment, the method may further include the at least one computer processor reordering the second elastic graph; the at least one computer processor calculating a second matching metric based on a comparison of the reordered second elastic graph to the first elastic graph; and the at least one computer processor selecting the higher of the first matching metric and the second matching metric.

In one embodiment, the method may further include the at least one computer processor generating a first sub-graph graph elastic graph for the first elastic graph based on the customization library; the at least one computer processor generating a second sub-graph elastic graph for the second elastic graph based on the customization library; and the at least one computer processor calculating a sub-graph matching metric based on a comparison of the first sub-graph elastic graph to the second sub-graph elastic graph.

Methods for translating a target document and an original documents to elastic graphs based on analysis of the documents characteristics are disclosed.

Methods for using a metric based analysis of document characteristics that may be based on a time stamp, a word match and language proximity, a statistical frequency analysis of the keywords, a vector based analysis, an overall keyword matching, etc. are disclosed.

Methods for generating hierarchical graphs consisting of markers from an original document are disclosed.

Methods for determining a level of hierarchy and sub-graph components customized for an original document are disclosed.

Methods for clustering nodes for hierarchical graph construction based on the logical/natural language connectivity among markers and connection strength and direction between nodes are disclosed.

Methods for calculating marker criticality based on marker content criticality are disclosed.

Methods for performing graph-based matching at customized levels of the hierarchy are disclosed.

Methods for dynamically creating markers based on the multi-stage analysis of the document and document type are disclosed. Customized dynamic thresholds may be employed at each stage of the process.

In one embodiment, the marker generation may be specific to the sector (e.g., industry, field, document type) and my include industry-specific expressions.

In one embodiment, the markers may be generated from numbers and numeric expressions.

In one embodiment, industry-specific expression translation libraries may be used to translate markers to alternative markers.

In one embodiment, a calculation of marker criticality importance may be calculated as a numeric value.

In one embodiment, the marker generation, keywords, graph hierarchy levels, thresholds, etc. may be customized for the original document's criticality level. For example, sensitive/confidential documents and public/press release documents may not be treated the same.

In one embodiment, marker generation may be based on a criticality of the markers in the document with respect to the field or document.

In one embodiment, the criticality may be based on industry specific libraries, document specific guidelines or learned through machine learning In one embodiment, the marker generation may be based on matching level between the original document and incoming document Methods for maintaining these databases/libraries based on the documents tracked and incoming/streaming/stored documents are disclosed.

Methods for document and information life cycle tracking based on the document matching profile analysis history are disclosed.

Methods for determining document/snippet tracking based on calculating an overall matching score using historical data and document customized thresholds per stage. In one embodiment, the historical matching scores and thresholds may be calculated for the document and streaming documents at nm time or stored documents are disclosed.

Methods for dynamically calculating matching scores for multiple documents (streaming or in the critical document data bases) in parallel are disclosed.

Methods for editing an original document and creating dynamic markers depending on the historical matching information for the document and document type are disclosed.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
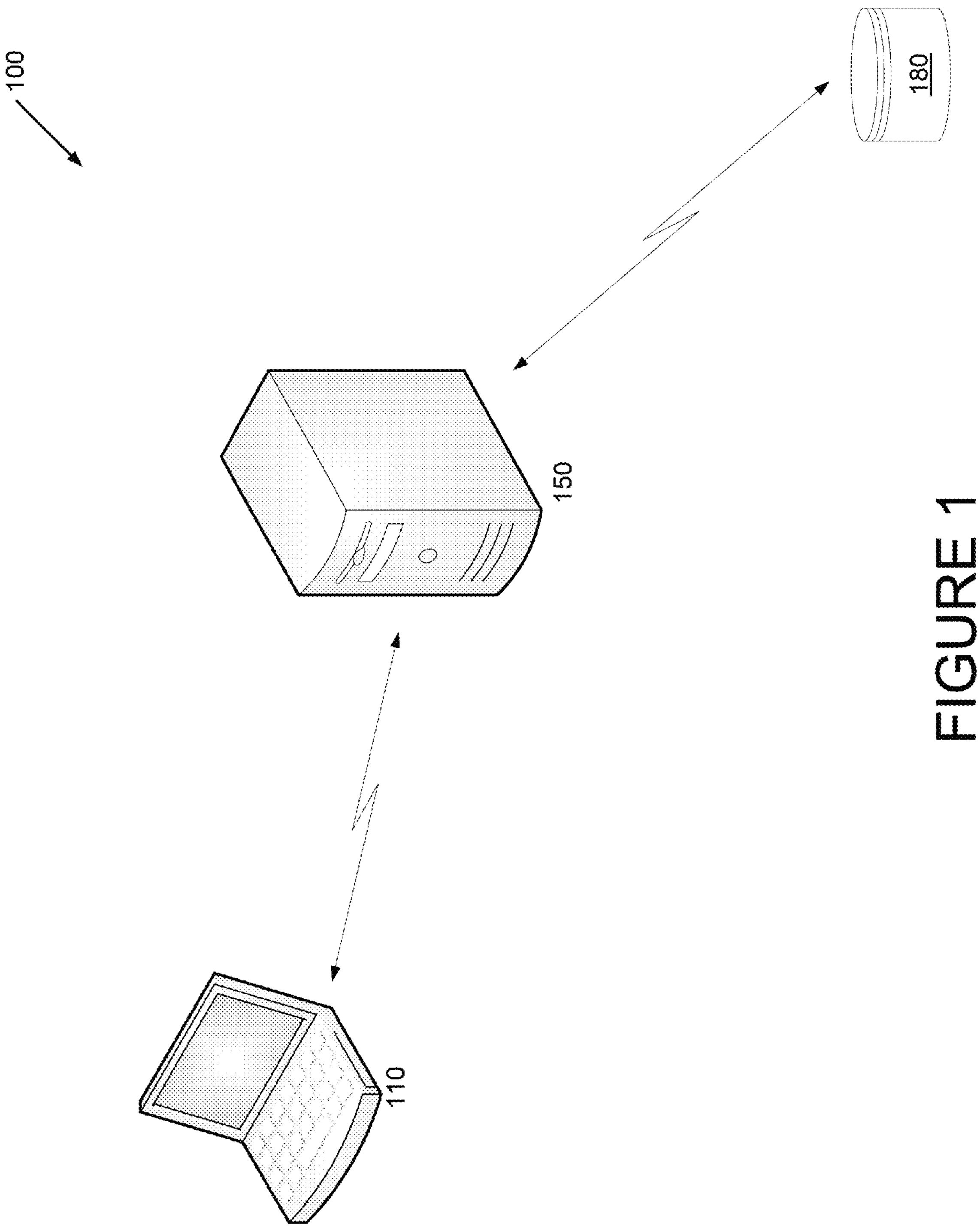
FIG. 1 is a block diagram of a system for document tracking using elastic graph-based hierarchical analysis according to one embodiment.

Several embodiments of the present invention and their advantages may be understood by referring to FIGS. 1-5, wherein like reference numerals refer to like elements.

The disclosure is generally directed to tracking the contents of documents, such as confidential or highly-sensitive documents (e.g., merger and acquisition documents, classified documents, etc.). The content of documents can be compared to other documents to determine the origin (or subsequent use) of the content.

Unlike plagiarism-checking software, which generally relies on the similarity of text in two documents to identify copying, embodiments disclose the use of markers—for example, document properties—to analyze documents. For example, the content analysis may begin by analyzing timestamps, watermarks, or other metadata, such as the time of creation, author, change logs, accesses, etc. to identify "easy" content matches. Next, the method may then "graph" the document using natural language processing to identify relationships among key words and/or phrases. The approach may further consider numeric expressions, acronyms, and alternate expressions for words or phrases.

The method may further consider the context of the document in view of the sector—the specific subject matter, field, industry, technology, audience, etc. for which it is authored. For example, certain keywords may have a greater importance and weight in certain fields or industries than in others. Thus, the weight of keywords/phrases may be considered for both the context of the document, as well as the for the document itself (e.g., frequency of use, etc.).

An "elastic graph" depicting the relationship among the markers may then be generated. The elastic graph allows for similarities between the contents of documents to be identified even if the documents do not have the same exact structure (e.g., the paragraphs/sentences are in different order, paragraphs/sentences are omitted/added, etc.). As two documents are analyzed, the respective elastic graphs for the documents may be reordered to maximize the matching score.

Based on the scoring, a likelihood that the contents of the documents are related may be determined.

Referring to FIG. 1, a block diagram of a system for document tracking using elastic graph-based hierarchical analysis according to one embodiment is provided. System 100 may include computer 110, server 150, and database 180.

Figure 2:
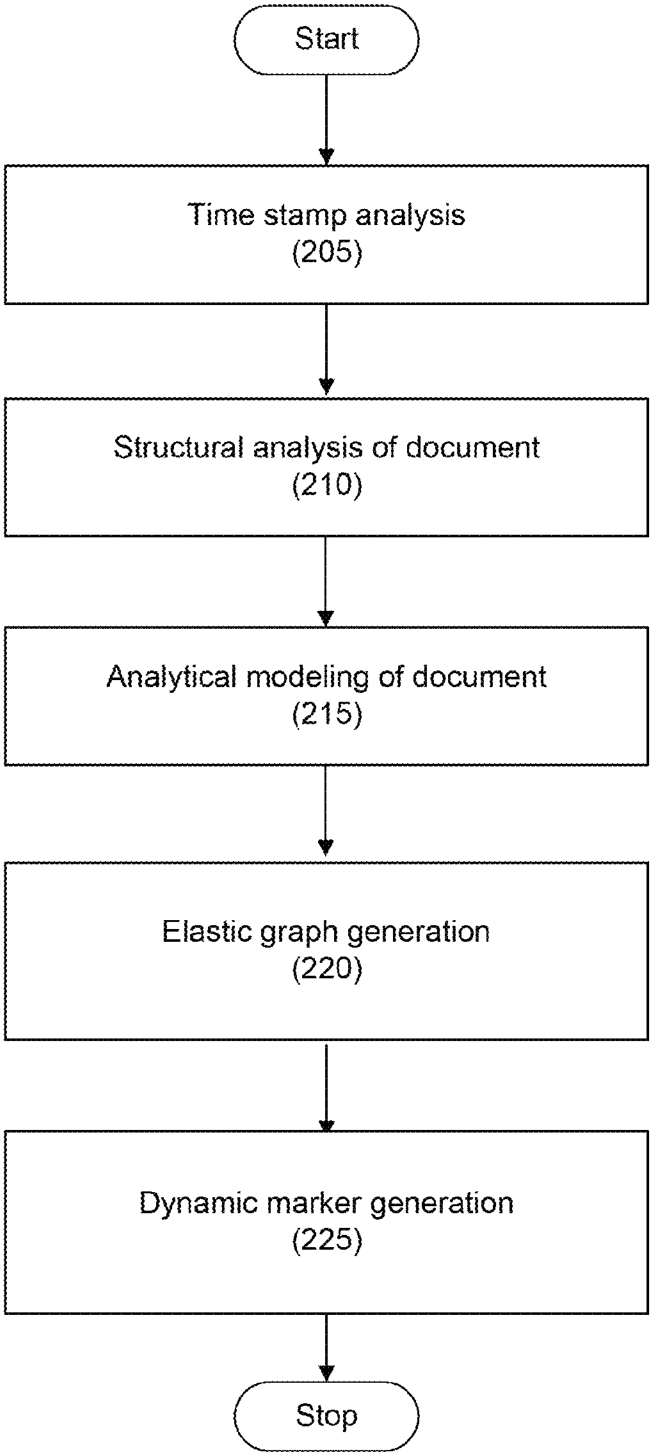
FIG. 2 is a flowchart depicting a method for document tracking using elastic graph-based hierarchical analysis according to one embodiment.

Referring to FIG. 2, a method for document tracking using elastic graph-based hierarchical analysis is disclosed. In stage 205, time stamp and/or existing watermark analysis may be performed on the document. In one embodiment, this may include the identification and analysis of any existing time stamps, metadata, watermarks, etc. that may be on or associated with the document. In one embodiment, the time stamps, metadata, watermarks, etc. may be within the document. In another embodiment, the time stamps, metadata, watermarks, etc. may be stored in a separate location. In another embodiment, external time stamps, such as references to the document in another document, may be identified Next, in stage 210, the structure of the document may be analyzed. In one embodiment, this analysis may involve the use of natural language processing to extract document characteristics. In one embodiment, each word or combination of words may be assigned to a category, and a corresponding vector may be generated for the structure of each text component. In one embodiment, this analysis may be performed at the word level, sentence level, collection of sentences level, paragraph level, document level, abstract level, etc.

For example, in one embodiment, each segment of the document (e.g., words, sentence, sentences, paragraphs, etc.) may be translated to a factor where in words, word types (e.g., nouns, adjectives, etc.), sentence structures, etc. may be translated to code. Factors corresponding to different sentences and paragraphs may be generated and may be used to check against factors in other documents.

In one embodiment, a function may be used to associate document segments with a numerical value. An example of such is described in Chen et al., "More than Word Frequencies: Authorship Attribution via Natural Frequency Zoned Word Distribution Analysis" Cornell University Press, 2012, the disclosure of which is incorporated by reference in its entirety. As another example, widgets that provide word frequency results may also be used.

Next, in stage 215, analytic modeling of the document may be performed. In one embodiment, keywords, the statistical occurrence of those keywords, and the rarity of those keywords may be identified. In addition, the use of numeric expressions, acronyms (and equivalents), etc. may be used as detection "nodes" or "markers."

For example, if the document being analyzed is about Company XYZ, the name of Company XYZ is likely to have a high importance and may be used as a detection marker.

In one embodiment, some or all of the words in the document may be ranked using a generic, standard ranking and/or sector-specific ranking for the words. Thus, words in documents that are related to the banking industry may have a different ranking than the same words in a document about chemistry.

In one embodiment, each keyword, expression, sequence of words/text structures, acronym, numeric expression, etc. may be marked and assigned a criticality value. In one embodiment, the criticality value may be retrieved from the customization library. The criticality value may be based on, for example, frequency of occurrence, the ranking (generic, specific, etc.).

Each marker may be further analyzed for alternative expressions, for example, inverted percentages (e.g., a 27% failure rate may equal 73% success rate), acronyms, alternative ways of expressing the same or similar concept. In one embodiment, customized libraries (referred to herein as customization libraries) for the specific sector, an application may be used to identify these alternative expressions. In one embodiment, the alternative expressions may further serve as markers in place of, or in addition to, the expressions in the document.

In addition, each marker may be analyzed for connectivity with other markers in the vector. The strength of the co-occurrence of the markers, as well as logical connectivity (e.g., proximity, order of occurrence, etc.) may be considered in the natural language processing.

Figure 3:
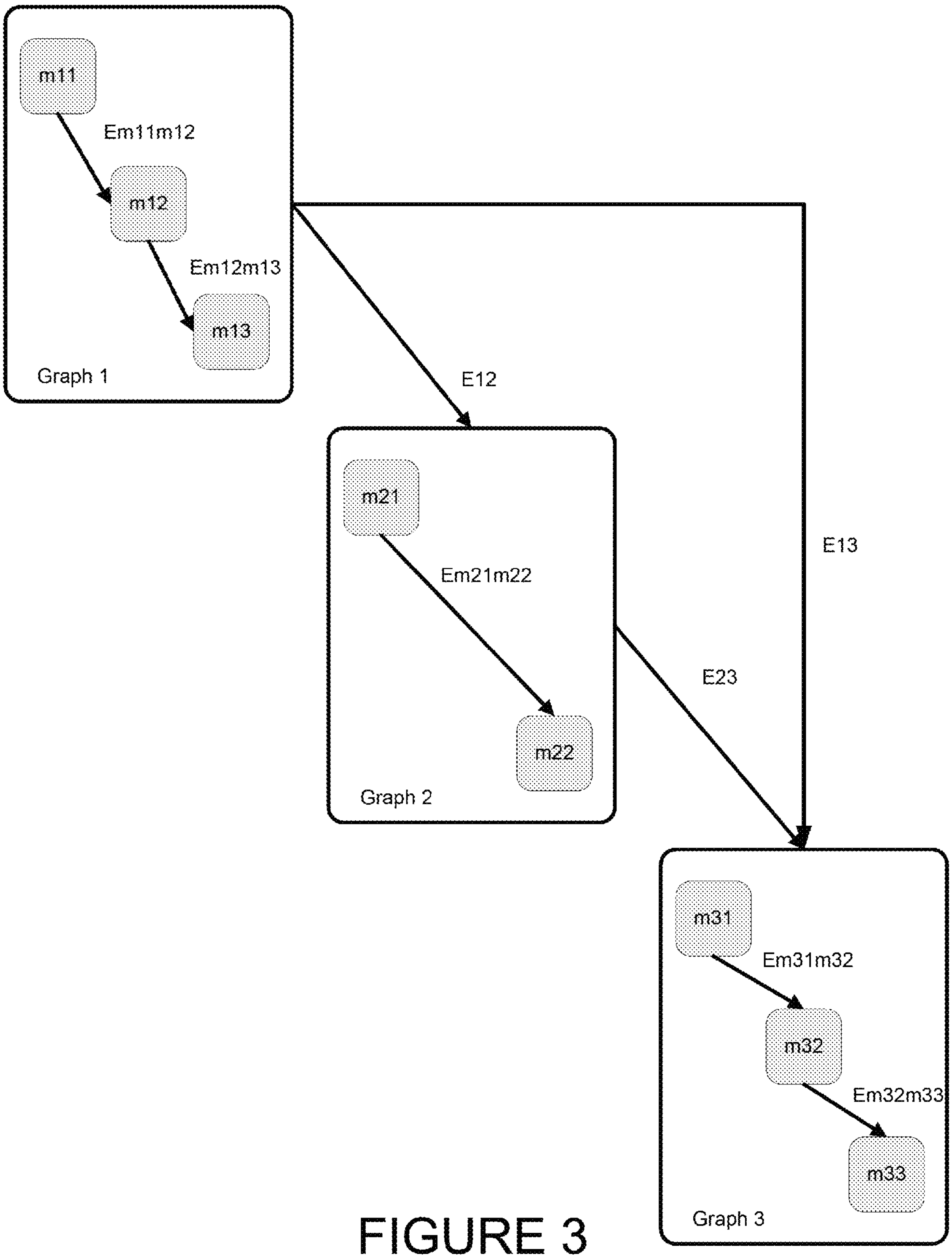
FIG. 3 is a schematic depicting of an elastic graph according to one embodiment.

In stage 220, an elastic graph consisting of the markers may be generated. Referring to FIG. 3, a graphical depiction of an elastic graph including three subordinate graphs (graphs 1, 2, and 3) is provided. In one embodiment, each marker (e.g., m11, m12, m21, m22, m31, m32, m33) may represent a customized marker, and each edge (e.g., Em11*m*12, Em12*m*13, E12, E13, etc.) may represent the connectivity or flow direction between the markers A hierarchical graph (or a "supergraph") may be constructed using the elastic graphs for different parts of the document. Each super graph, graph, etc. may be used for matching documents at different speed levels, different accuracy levels, etc.

The use of a hierarchical graph instead of a simple sequence of markers allows the analysis and/or comparison of documents that may have undergone substantial editing, scrambling or rearranging of text, etc. For example, an elastic graph may be rearranged while the relationship between the markers is maintained. Thus, documents having a high level of editing and scrambling or rearranging of text (with other components from the same document or external sources) may effectively be compared.

Referring again to FIG. 2, in stage 205, markers may be dynamically generated. For example, during the analysis of a potentially-matching document, the accuracy and granularity levels of the algorithm (such as marker types tracked, marker count, hierarchical block granularity, etc.) may be dynamically adjusted.

In one embodiment, the elastic graphs may be further diversified at different levels of granularity in the hierarchy. Each graph may be of a different size, and may be determined by the clustering connection strength of the markers in the cluster. For example, marker m12 may have a high clustering connection strength based on it being required to follow m11. Another marker, such as one that is not required to follow m11, may have a weaker connection strength and, as a result, may be in a different cluster.

A matching score for the two documents may be generated. For example, matching scores for different parts of the document may be generated. In one embodiment, different matching scores may be generated. For example, a matching score for the entire documents may be determined, as well as for different parts of the documents. This may be particularly useful, for example, when only a part of a document is copied, while the remainder is not.

For each potential match, the elastic graph may be reordered to maximize the matching score. By this reordering, the effect of any scrambling may be reduced or eliminated.

In addition, due to the elastic nature of the graph, the merging of external blocks with those having lower matching scores may be addressed. For example, certain documents may incorporate custom text or external sources. Based on the level of matching and the hierarchical matching scores/locations, a finer grain analysis may be performed based on the dynamic decision (using the pre-processed collection of alternatives as described above).

In one embodiment, depending on the matching granularity, e.g., whether it is at the top level or finest grain graph of the document's graph representation, an algorithm may use a metric that is customized to the sector and the criticality of the keywords to determine the matching graph to analyze. For example, if the critical keyword or keywords appear in one cluster of the text, and the matching level is close to zero for the rest of the document, only the matching graph for this section may be used for the remaining analysis.

In addition, a similar analysis may be performed as a step in automatic text analysis of documents such as suspicious emails, data leakages, document/text info leakages etc.

Figure 4:
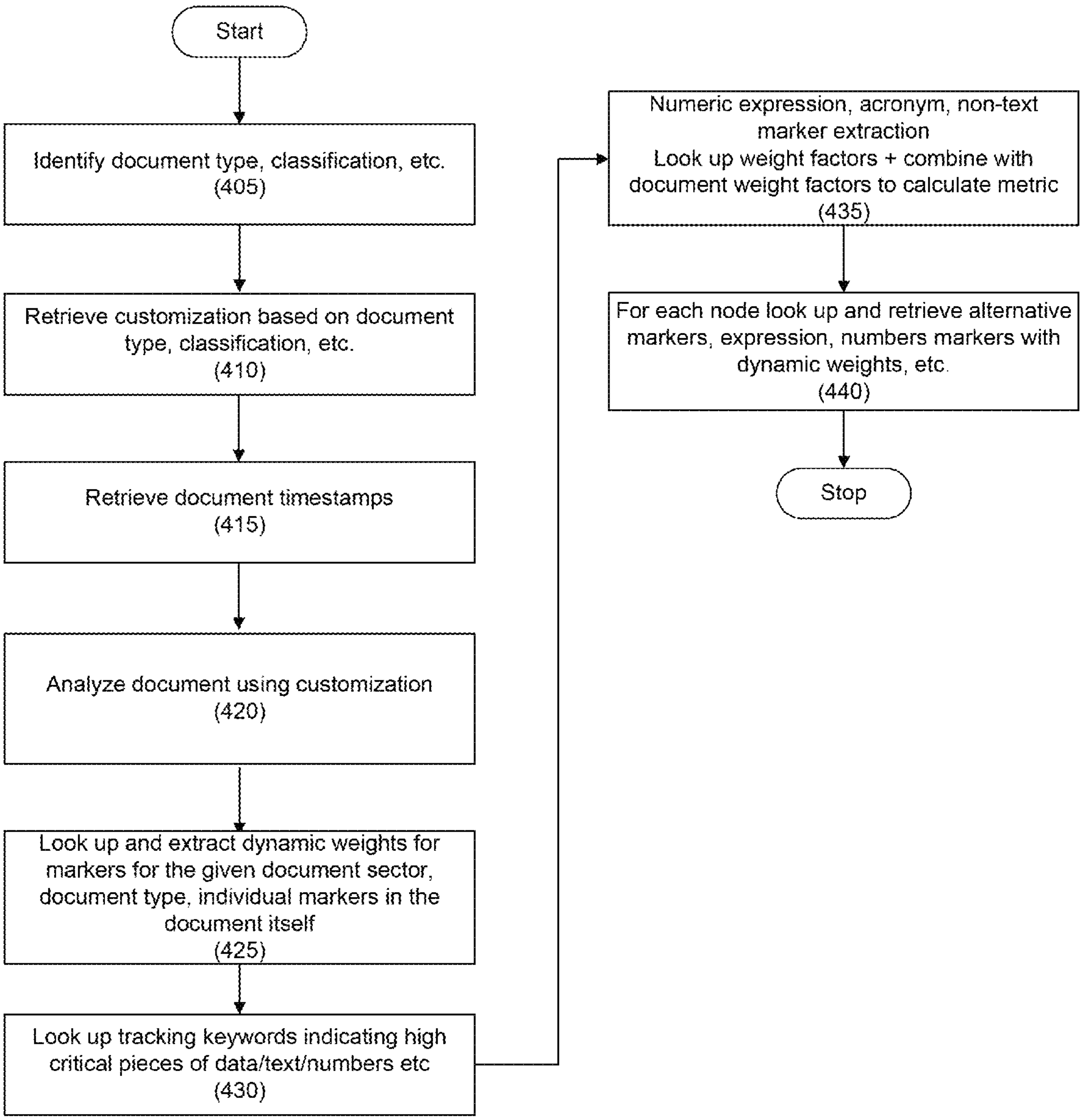
FIG. 4 is a flowchart depicting a method for elastic graph-based hierarchical analysis of a document according to one embodiment.

Referring to FIG. 4, a method for elastic graph-based hierarchical analysis of a document according to one embodiment is provided.

In step 405, the document type, classification, sector, subject matter, criticality level, and any other document characteristics may also be identified. In one embodiment, these characteristics may be used to identify certain keywords, keyword weights, etc. that may be used in the analysis process.

In step 410, a customization library based on identified document characteristics(s) may be retrieved. In one embodiment, the customization library may be retrieved from a database. In another embodiment, the customization library may be entered by the user. In still another embodiment, the customization library may be learned based on previously-analyzed documents. Any other source for the customization library may be used as necessary and/or desired.

In step 415, any existing document timestamps, watermarks, etc. may be extracted from the document and/or retrieved from a separate location. In one embodiment, the timestamps, watermarks, etc. may include the date of document creation, the author, document editing history, document sharing history, etc. In one embodiment, the amount of document information that is considered, retrieved, etc. may be based on the criticality level of the document and/or circumstances concerning the document (e.g., leaks, etc.).

In step 420, the document may be analyzed using the customization library. In one embodiment, this may include analyzing the document based on its structure, characteristics, keyword intensity, numeric marker intensity, extracting customized markers, etc. A statistical analysis of the document's characteristics may also be performed.

In one embodiment, the structural analysis may include natural language processing of the individual sentences. Statistical analysis of the characters and words that are common, uncommon, etc. may be determined. The occurrence and frequency of occurrences of keywords may be identified. The intensity of numeric markers and key words may be identified, so that customized markers for that document may be extracted.

In step 425, weights for known markers for the document may be identified. In one embodiment, this may be based on the document sector, document type, individual markers in the document itself. In one embodiment, the individual characteristics of the document may include word frequency, different key words, numerical markers, etc., with the sector type characteristics and/or customization library as guidelines. Thus, the characteristics of the document (e.g., characters, words, structure, etc.) may be considered a based on the customization library. Weights for the markers from the customization library may be applied.

In one embodiment, the equation Wc=f(DBtype, Dbdoc) meaning that the weight is a function of function of DBType and DBdoc. DBtype may identify the database that stores information on the type of document, such as the sector, the type, characteristics, etc. For example, if the document is a banking document, those weight factors are averaged for all types of similar documents and stored in a database.

Dbdoc may identify the collection of potential matching documents with which the document will be compared. In one embodiment, this collection may include documents for a specific sector, documents from a certain source, documents that have been identified by a user, etc. In one embodiment, the type or identification may be purely machine-learning based or it may be based on standard document structures from external or internal references, or it may be based on a combination thereof. In one embodiment, if the document is about a bank, documents that reference that bank may be identified for Dbdoc.

In one embodiment, Dbdoc may include all accessible documents from on-line sources, libraries, databases, etc.

In step 430, tracking keywords that indicate certain pieces of data, text, numbers, etc. may be identified.

In step 435, numeric expressions, acronyms, non-text markers, etc. may be extracted. In one embodiment, weight factors for these may be retrieved from the customization library and/or the standard library and may be combined with document weight factors to calculate a metric.

In one embodiment, for each marker, alternative markers, expressions, numbers, etc. may be retrieved.

Figure 5:
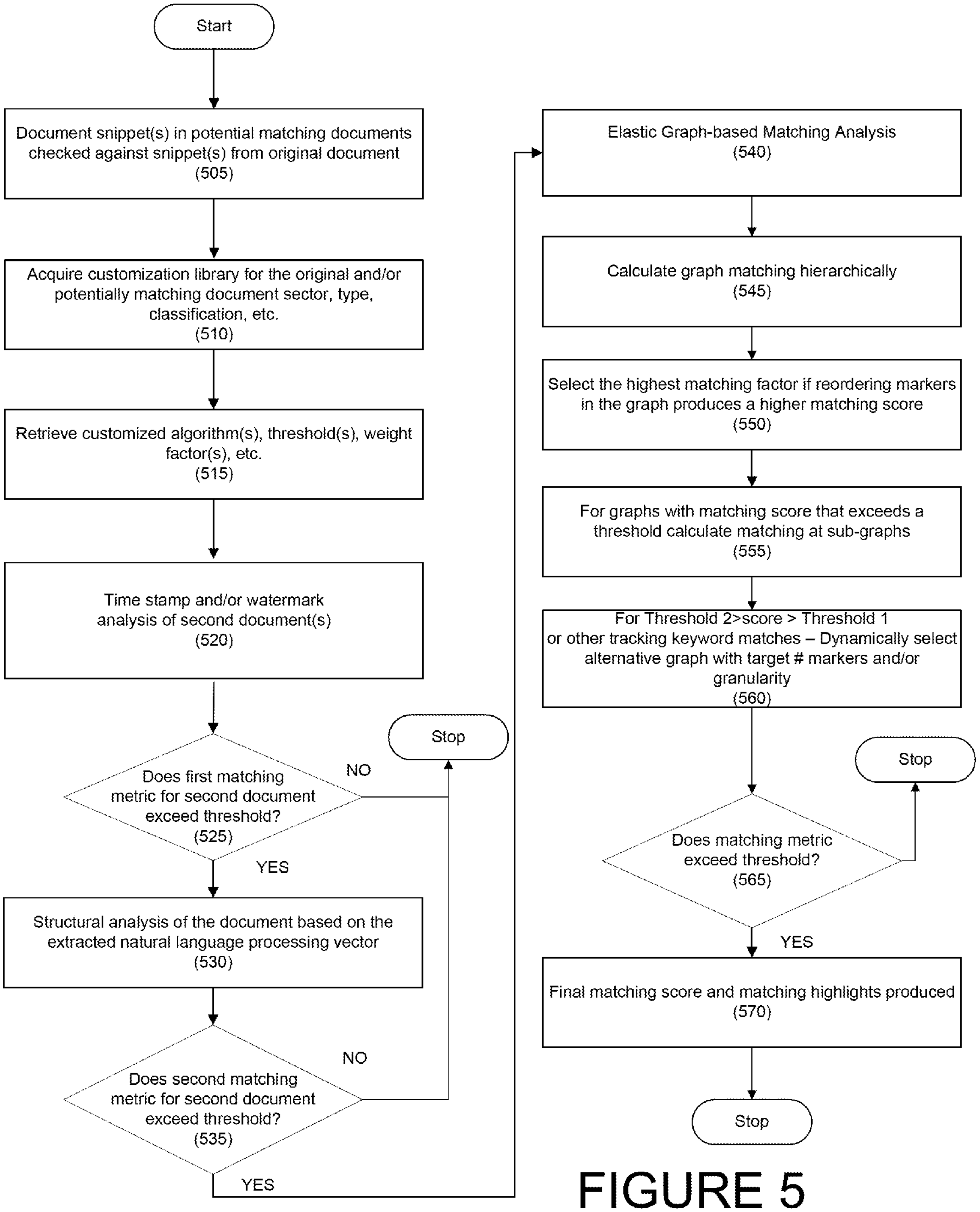
FIG. 5 is a flowchart depicting a method for document processing using elastic graph-based hierarchical analysis according to one embodiment.

Referring to FIG. 5, a flowchart depicting a method for document processing using elastic graph-based hierarchical analysis according to one embodiment is provided. In step 505, document snippet(s) for potentially matching document(s) may be checked against an original document. In one embodiment, the snippet(s) from the potentially matching document(s) may be compared to snippet(s) from the original document. In one embodiment, this may be repeated for all potential matching documents.

In step 510, a customization library for the document type, sector, classification, other characteristics, etc. may be accessed. In one embodiment, the document type, sector, classification, other characteristics, etc. for the original document and/or potential matching document(s) may be identified, and the appropriate customization library may be retrieved. In one embodiment, the customization library may be retrieved from a database, from an individual, may be learned from the documents, etc.

In step 515, customized algorithm(s), threshold(s), weight factor(s), etc. may be acquired for the document type, sector, classification, other characteristics, etc. may be acquired. In one embodiment, the customized algorithm(s), threshold(s), weight factor(s), etc. may be retrieved from a database, from an individual, may be learned from the documents, etc.

In step 520, time stamp and/or watermark analysis of the potential matching document(s) may be performed. In one embodiment, any existing timestamps, watermarks, etc. may be extracted from the potential matching document(s) may be extracted and/or retrieved from a separate location. In one embodiment, the timestamps, watermarks, etc. may include the date of document creation, the author, document editing history, document sharing history, etc. In one embodiment, the amount of document information that is considered, retrieved, etc. may be based on the criticality level of the document and/or circumstances concerning the document (e.g., leaks, etc.).

In step 525, a check is made to see if a first matching metric for the potential matching document(s) exceeds a threshold. If it does, in step 530, the structure of the potentially-matching document is analyzed using natural language processing. In one embodiment, an extracted natural language processing vector may be used.

In one embodiment, the threshold may be based on, for example, the sector.

If the first matching metric does not exceed a threshold, then the process may stop as the potentially-matching document is unlikely to be a match or contain matching content.

In step 535, a check is made to see if a second matching metric exceeds a second threshold. This step may be similar to step 525. The number of matching metrics and comparisons may be selected as necessary and/or desired. In one embodiment, each "stage" may be associated with a threshold, and that threshold may be the same, or it may be defined specifically for that stage.

Similar to step 525, if the threshold is not exceeded, the comparison may stop.

In step 540, elastic graph matching analysis may be performed. In one embodiment, this may include creating an elastic graph for the potentially matching document(s) based on, for example, custom analysis of the document for the given sector; calculated weights for individual markers; numeric, acronym, non-text marker based analysis; vector based metric, based on matching with the original document.

In step 545, a graph matching hierarchy value may be calculated. In one embodiment, this may be based on the matching between markers, edges, etc. In one embodiment, a plurality of graph matching hierarchy values may be calculated.

In step 550, the highest matching value may be selected. For example, markers may be reordered to produce the highest matching value.

In step 555, the highest graph matching hierarchy value may be compared to a threshold. In one embodiment, this threshold may be based on the sector for the document, it may be based on a general document type, or it may be a combination thereof.

If the value exceeds the threshold, matching values for any sub-graphs may be calculated.

In step 560, if the sub-graph score is between thresholds (e.g., threshold 1 and threshold 2), or if other tracking keyword/expression matches, an alternate graph having a target number of markers/granularity may be selected. In one embodiment, the thresholds may be based on the sector, or they may be based on a general document time, or a combination thereof, etc.

In step 565, if the matching metric for the alternate graph exceeds the threshold, in step 570, the final matching score and matching highlights may be provided to the user. If it does not, the process may be complete.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for elastic graph-based hierarchical analysis of a text document, comprising:

at least one computer processor identifying a sector for the text document;

the at least one computer processor retrieving a customization library for the text document based on the sector;

the at least one computer processor analyzing a structure of the text document using the customization library, whereby a plurality of markers in the text document are identified; and the at least one computer processor generating an elastic graph for the text document based on the plurality of markers.

2. The method of claim 1, wherein natural language processing is used to analyze the structure of the text document.

3. The method of claim 1, wherein the at least one of the markers is an expression.

4. The method of claim 3, wherein the expression is a keyword.

5. The method of claim 3, wherein the expression is an alternate expression for a keyword.

6. The method of claim 1, wherein at least one of the markers is a node.

7. The method of claim 1, wherein at least one of the markers is an edge.

8. The method of claim 1, further comprising:

the at least one computer processor applying a weight to at least one marker.

9. The method of claim 8, wherein the weight is determined from the customization library.

10. The method of claim 1, wherein the step of analyzing a structure of the text document comprises:

the at least one computer processor performing a metric-based analysis of the text document based on at least one of a time stamp, a word match, a language proximity, a statistical frequency analysis of a plurality of expressions, a vector based analysis, and an expressions match.

11. The method of claim 1, wherein the sector comprises at least one of a subject matter of the text document, an industry for the text document, and an audience for the text document.

12. The method of claim 1, wherein the identification of the plurality of markers is further based on a criticality level of the text document.

13. A method for comparing a first text document to a second text document, comprising:

at least one computer processor identifying a sector for the first text document;

the at least one computer processor retrieving a customization library for the first text document based on the sector;

the at least one computer processor generating an elastic graph for the first text document based on the customization library;

the at least one computer processor generating an elastic graph for a second text document based on the customization library; and the at least one computer processor comparing the elastic graph for the first text document to the elastic graph for the second text document.

14. The method of claim 13, wherein the step of comparing the elastic graph for the first text document to the elastic graph for the text second document comprises:

comparing a plurality of markers in the elastic graph for the first text document to a plurality of markers in the elastic graph for the second text document.

15. The method of claim 14, wherein the step of comparing the elastic graph for the first text document to the elastic graph for the second text document comprises:

determining that a matching metric for the comparison exceeds a threshold.

16. The method of claim 15, wherein the threshold is based on the customization library.

17. The method of claim 14, wherein the step of comparing the elastic graph for the first text document to the elastic graph for the second text document comprises:

the at least one computer processor generating a sub-graph for the elastic graph for the first text document based on the customization library;

the at least one computer processor generating a sub-graph for the elastic graph for the second text document based on the customization library; and the at least one computer processor comparing the sub-graph for the elastic graph for the first text document to the sub-graph for the elastic graph for the second text document.

18. The method of claim 13, further comprising:

the at least one computer processor reordering the elastic graph for the first text document; and the at least one computer processor comparing the reordered elastic graph for the first text document to the elastic graph for the second text document.

19. The method of claim 13, further comprising:

the at least one computer processor generating an elastic graph for a third text document; and the at least one computer processor comparing the elastic graph for the first text document to the elastic graph for the third text document.

20. The method of claim 13, wherein the first text document comprises at least a portion of the first text document, and the second text document comprises at least a portion of the second text document.

21. A method for comparing a first text document to a second text document, comprising:

at least one computer processor identifying a portion of a first text document and a portion of a second text document for comparison;

the at least one computer processor identifying a sector for the first text document;

the at least one computer processor retrieving a customization library based on the sector;

the at least one computer processor comparing at least one of a time stamp and a watermark from the first text document to a time stamp or watermark in the second text document;

the at least one computer processor using natural language processing to structurally analyze the portion of the first text document and the portion of the second text document;

the at least one computer processor generating an first elastic graph for the portion of first text document and a second elastic graph for the portion of the second text document based on the customization library; and the at least one computer processor calculating a first matching metric based on a comparison of the first elastic graph to the second elastic graph.

22. The method of claim 21, further comprising:

the at least one computer processor reordering the first elastic graph;

the at least one computer processor calculating a second matching metric based on a comparison of the reordered first elastic graph to the second elastic graph; and the at least one computer processor selecting the higher of the first matching metric and the second matching metric.

23. The method of claim 21, further comprising:

the at least one computer processor reordering the second elastic graph;

the at least one computer processor calculating a second matching metric based on a comparison of the reordered second elastic graph to the first elastic graph; and the at least one computer processor selecting the higher of the first matching metric and the second matching metric.

24. The method of claim 21, further comprising:

the at least one computer processor generating a first sub-graph graph elastic graph for the first elastic graph based on the customization library;

the at least one computer processor generating a second sub-graph elastic graph for the second elastic graph based on the customization library; and the at least one computer processor calculating a sub-graph matching metric based on a comparison of the first sub-graph elastic graph to the second sub-graph elastic graph.

* * * * *